United States Patent [19]

Penney et al.

[11] Patent Number: 4,701,031
[45] Date of Patent: Oct. 20, 1987

[54] PRISM TELESCOPE TO MATCH OPTICAL REQUIREMENTS FOR ACOUSTO-OPTIC DEFLECTOR

[75] Inventors: Carl M. Penney, Schenectady, N.Y.; Bradley S. Thomas, Altamonte Springs, Fla.

[73] Assignee: General Electric Company, Schenectady, N.Y.

[21] Appl. No.: 868,379

[22] Filed: May 29, 1986

[51] Int. Cl.[4] .............................................. G02F 1/11
[52] U.S. Cl. .................................... 350/371; 350/286; 350/287; 350/421
[58] Field of Search ............... 350/371, 286, 287, 574, 350/421, 358, 370

[56] References Cited

U.S. PATENT DOCUMENTS

| | | | |
|---|---|---|---|
| 2,843,015 | 7/1958 | Luboshez | 350/286 |
| 3,799,652 | 3/1974 | Torgurt | 350/421 |
| 3,810,688 | 5/1974 | Ballman et al. | 350/371 |
| 4,580,879 | 4/1986 | Wilson | 350/286 |
| 4,626,102 | 12/1986 | Storck et al. | 350/358 |

OTHER PUBLICATIONS

T. W. Hänsch, "Repetitively Pulsed Tunable Dye Laser for High Resolution Spectroscopy", Appl. Optics, vol. 11, No. 4, Apr. 1972, pp. 895–898.

Primary Examiner—Bruce Y. Arnold
Assistant Examiner—Martin Lerner
Attorney, Agent, or Firm—Campbell, Donald R.; James C. Davis, Jr.; Paul R. Webb, II

[57] ABSTRACT

Two identical prism telescopes each comprised of a train of right angle prisms are used to spread out a laser beam to the maximum width of an acousto-optic cell and reconverge the beam to original dimensions. The first telescope increases the beam size along one dimension while bending the beam through 90°. The second telescope reduces the beam size and multiplies the angle of deflection while redirecting the beam through another 90°. There is a 180° fold in optical path and this configuration is compact, has low losses, and is easy to mount and align.

14 Claims, 5 Drawing Figures

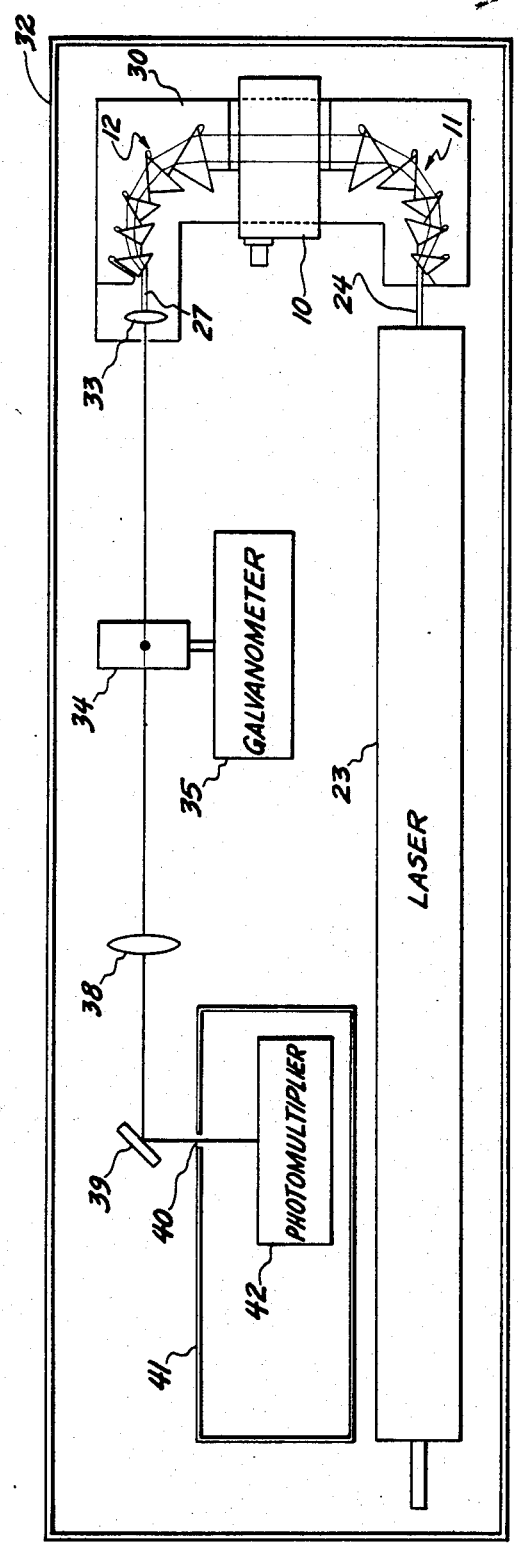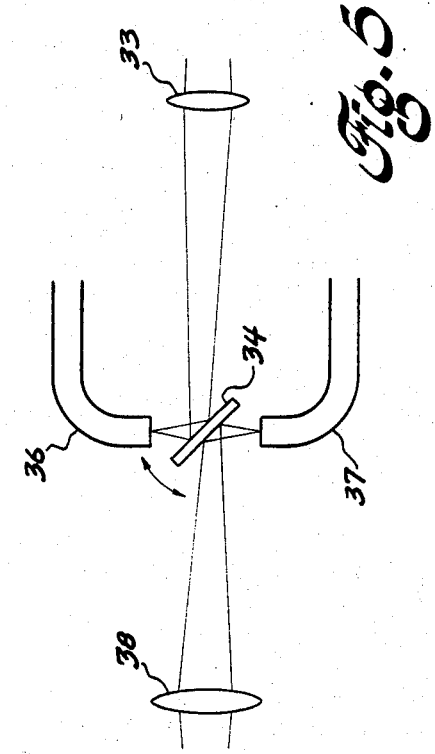

PRISM TELESCOPE TO MATCH OPTICAL REQUIREMENTS FOR ACOUSTO-OPTIC DEFLECTOR

BACKGROUND OF THE INVENTION

This invention relates to an optical system to shape and direct light through an acousto-optic deflector, and especially to a compact beam deflection system using prism telescopes in which the beam is folded through 180°.

An acousto-optic deflector achieves the maximum number of resolved spots across its deflection range when the incident beam of light to be deflected is spread out in the direction of deflection to the maximum width of the cell before passing through the cell. After passing through the cell, it is desirable often to reconverge the beam to an approximately spherical shape, in order to obtain a deflected beam which has approximately equal dimensions in the directions parallel to and perpendicular to the direction of deflection, and in order to obtain the magnification of deflection angles which accompanies this reduction in beam size. These operations upon the incident beam are often performed by cylindrical lenses, or a combination of cylindrical and spherical lenses.

However, cylindrical lenses are both more difficult to manufacture and more difficult to mount than the more usual spherical lenses. The difficulty can be illustrated by noting that cylindrical lenses must be aligned about one more dimension than spherical lenses, namely about the axis parallel to the direction of normal incidence of the beam upon which they operate. In fact, this alignment must be painstakingly precise when substantial expansion is required. Additionally, the physical space required to accomplish a stable beam expansion from, say, a one millimeter diameter cylindrical beam to a beam with dimensions of one millimeter by twenty millimeters (a typical requirement) is quite large (typically ten inches) and the quality and resultant cost of cylindrical lenses to achieve close to theoretical maximum resolution is quite high.

SUMMARY OF THE INVENTION

The optical system described here performs the same or similar function with greater mechanical stability and convenience, uses less costly optical elements, is easier to mount, and requires less space. This configuration can be regarded as a prism telescope. Light passing through the corner of a prism can either increase or reduce the beam size in one dimension and simultaneously bend the light beam through some angle.

An improved and more compact light beam deflection system has incident and exit prism telescopes, which may be identical but in mirror image relation, and an acousto-optic deflector as explained above to deflect an incident beam of light through a range of angles. The telescopes are comprised of a train of optical prisms, preferably 45-90-45 degree right angle prisms. A light source such as a polarized laser provides a substantially symmetrical input beam. The first telescope progressively increases the beam size along one dimension to the maximum width to fill the active cell region and maximize cell resolution while redirecting the expanded beam through an angle of 90°. The second telescope reduces the beam size by the same factor while increasing the angle of deflection by the same factor and also redirecting the beam through an additional angle of 90°. The output beam is folded through 180° relative to the input beam and has approximately the original dimensions and is scanned along one axis, say the X axis. One face of each prism is operated at Brewster's angle to reduce losses.

A feature of the invention is ease of alignment of the prism telescopes. One or more of the prisms is rotated slightly about an axis perpendicular to its supporting base in order to adjust the angular path of the light beam precisely.

Another feature is ease of mounting and greater mechanical stability. A recessed but otherwise flat mounting plate has triangular stop surfaces to receive the prisms and assure their alighment, and the acousto-optic deflector and the two prism telescopes are secured to this patterned plate.

Yet another aspect of the invention is that the beam deflection system can further comprise a Y scanner, particularly a mirror controlled by a galvanometer, to scan the output beam along a second axis orthogonal to the first.

One application of the compact, factory hardened, folded beam deflection system is in the optical system of a flying spot profiler for weld groove tracking and robotic welding.

BRIEF DESCRIPTION OF THE DRAWINGS

FIG. 4 is a simplified top view of the optical system (less sensor head) of a flying spot surface profiler.

FIG. 5 shows features not seen in FIG. 4, a side view of the scanner mirror and fiber optic bundles leading to the sensor head.

DETAILED DESCRIPTION OF THE INVENTION

Figure 1:
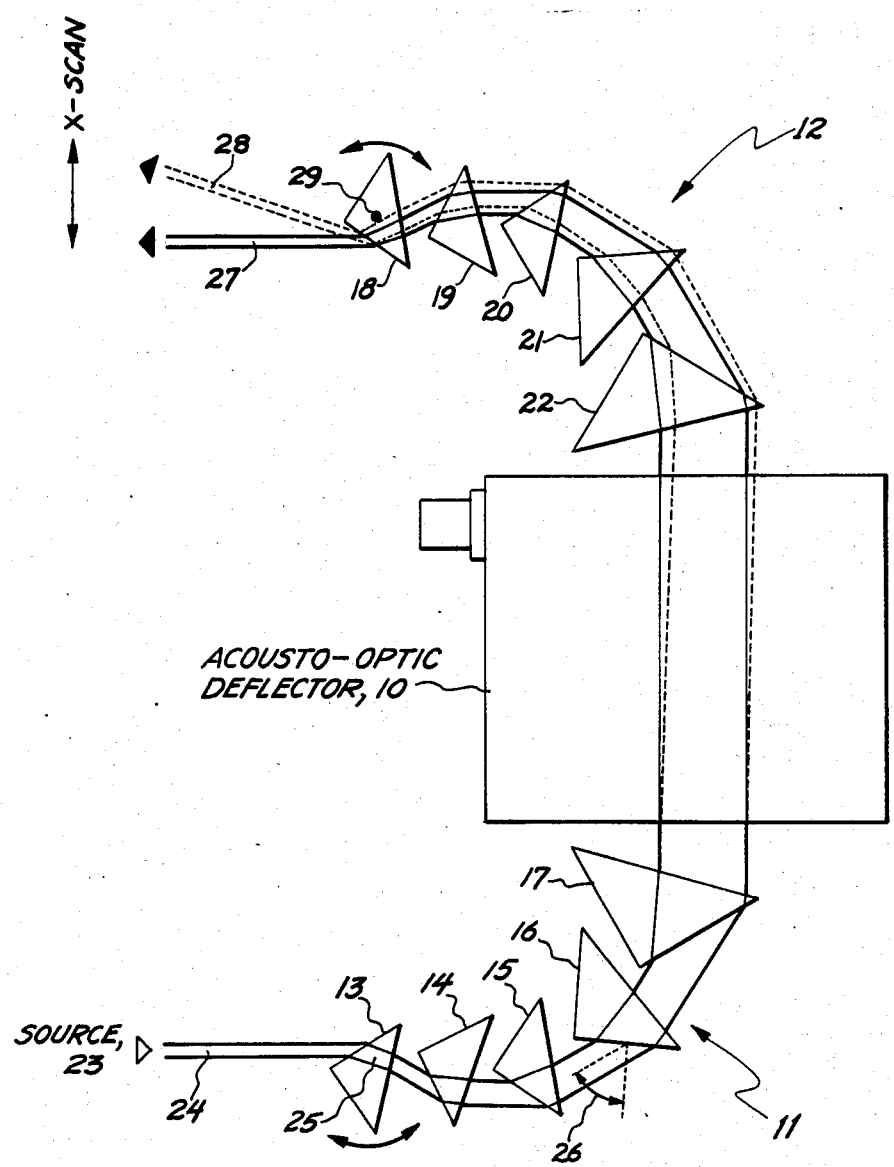
FIG. 1 shows a light beam deflection system using prism telescopes to fold the beam through 180° and provide matching requirements to an acousto-optic cell.

The acousto-optic deflector 10 in FIG. 1 is a commercially available device whose principle of operation is that a varying ultrasonic wave pressure causes the refractive index of the material to vary in periodic fashion such that it resembles a grating that diffracts a large portion of the light. The ultrasonic frequency is typically 40 MHz. The brightness of the deflected emerging beam of light is controlled by varying the magnitude of the input voltage, and the angle of deflection is scanned through a range of angles by modulating the frequency of the input signal. Two identical prism telescopes 11 and 12 provide an expanded light beam to maximize acousto-optic cell deflection resolution, deflection magnification with beam reduction, and a 180° fold in optical path. In the preferred embodiment incident telescope 11 is comprised of a train of five 45-90-45 degree right angle prisms 13-17, and exit telescope is comprised of a like number of such optical prisms 18-22. The first telescope 11 increases the beam size along one axis by a factor of seven while redirecting the beam through an angle of 90°. The second telescope 12 reduces the beam size by the same factor of seven while increasing the angle of deflection by the same factor and also redirecting the beam through an additional angle of 90°.

Light source 23 is typically a polarized laser and provides a cylindrically symmetric input beam 24, but may be any suitable source of visible or invisible light. As the input beam is incident on optical prism 13, for instance, and refracted at the air-glass interface it is seen that the refracted beam 25 is expanded along one dimension. Upon exiting the prism there is only a small amount of refraction at the glass-air interface and very little bending and expansion of the light beam. One face of each prism is operated at or near Brewster's angle with a polarized laser, reducing loss by Fresnel reflection from those faces to nearly zero. Brewster's angle is indicated at 26, the angle of incidence of the light beam at the short face of prism 16. The second utilized face of each prism, the hypotenuse, can be anti-reflection coated to hold total light loss to negligible amounts. In exit prism telescope 12 the expanded beam is incident on the hypotenuse of each prism approximately at right angles, and the reduction in beam size and redirection of the beam occurs at the short face where the reduced beam emerges at Brewster's angle.

The light beam incident on acousto-optic deflector 10 is expanded to the maximum width to fill the active region of the cell, typically 2 mm×20 mm, and maximize cell resolution. The amount of light beam deflection in the cell is very small, so it is important that there is a multiplication of the angle of deflection by exit prism telescope 12. The deflected beams 27 and 28 at first and second scan angles are illustrated in full lines and dashed lines. The reconverged output beam has cross-sectional dimensions approximately equal to the original dimensions, and is scanned along one axis, the X axis as shown. The output beam is folded through 180° relative to the input beam, resulting in a compact configuration. One or more of the prisms in each train can be made to rotate slightly about an axis perpendicular to its supporting base in order to adjust the angular path of the light beam precisely and provide alignment with an input or output device. For instance, prism 18 is rotated about an axis 29 to precision align the output beam.

At least three prisms in a train are needed to bend a light beam through 90°. Two prisms are added in FIG. 1, namely prisms 13 and 14, to increase the beam size along one direction without redirecting the beam. Thus the beam emerging from prism 14 is parallel to input beam 24. Each prism train is comprised of an odd number of prisms, greater than three and in general less than nine. Other types of prisms have utility in these prism telescopes, but the right angle prism is widely available in many sizes and is relatively inexpensive. Prisms 13–15 are the same size and prisms 16 and 17 are respectively larger to accommodate the expanded beam size.

Figure 2:
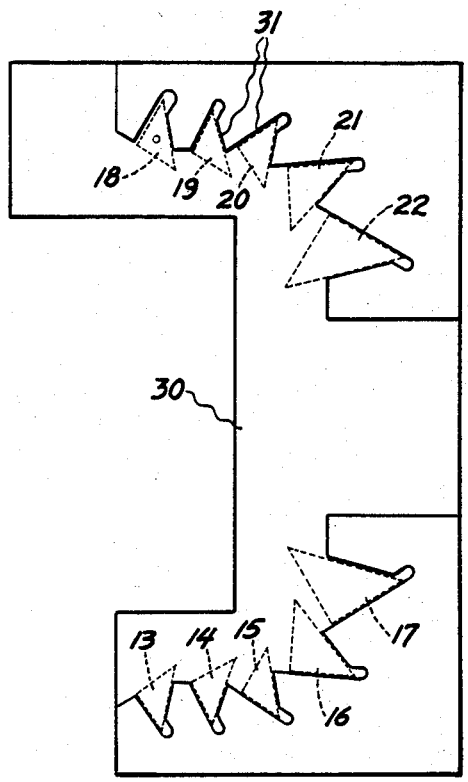
FIGS. 2 and 3 are plan and side views of the mounting plate of the folded beam deflector with the prisms illustrated in dashed lines.
Figure 3:
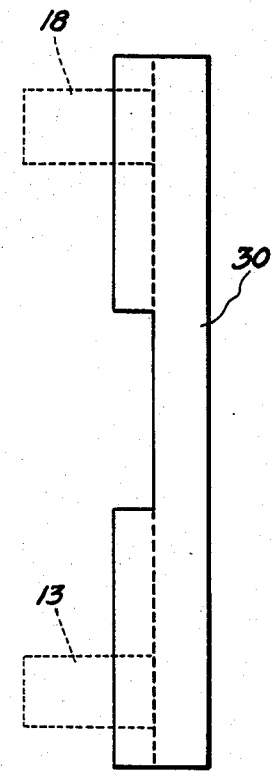

The prism telescopes and this light beam deflection system are easy to mount and perform the same function as prior art configurations with greater mechanical stability and convenience. Referring to FIGS. 2 and 3, a recessed patterned mounting plate 30 is provided to which the acousto-optic cell 10 and both prism trains 11 and 12 are secured in proper alignment. The two-level mounting plate 30 can be machined on a numerically controlled machine tool and has a pattern of recesses and prism stop surfaces 31. This patterned plate allows easy assembly of the prisms against their respective triangular stops with one flat base cemented to the plate. One prism such as prism 18 has an oversized triangular recess so that the prism can be adjusted and rotated slightly to align the optical path precisely. This mounting arrangement does not interfere with the light beam; the part of the prism that transmits the beam is well above plate 30.

One application of the compact folded beam deflector is an X scanner in the optical system of a flying spot surface profiler which is described in copending application Ser. No. 739,632, filed May 31, 1985, now U.S. Pat. No. 4,645,917, C. M. Penney, B. S. Thomas, and R. N. Roy, "Swept Aperture Flying Spot Profiler". The optical system with the exception of a sensor head is contained in the box 32 shown in FIG. 4 which, in one profiler that was built and operated successfully, is mounted on a robot arm and has the overall dimensions of $26\frac{1}{2}'' \times 8\frac{1}{2}'' \times 6\frac{1}{2}''$. The high voltage supplies and electronics inside housing 32 are not illustrated. Laser 23 and input beam 24 are shown and, at the far right, the acousto-optic cell 10 and prism telescopes 11 and 12, assembled on mounting plate 30. The output beam 27 of the deflector is scanned in the X direction over a range of angles and focused by a lens 33 onto a mirror 34 which is controlled by a galvanometer 35 and serves as a Y scanner. The beam reflected by scanning mirror 34 is imaged onto the entrance face of a coherent fiber optic bundle 36, FIG. 5, for passage to the optical sensor head (not shown) which projects the X and Y scanned beam in a zig-zag pattern onto a surface whose profile is determined. The surface profile information is, in a weld groove tracking application, the height of the surface and weld groove location.

The reflected spot of light is imaged by a lens in the optical sensor head onto the end of a second fiber optic bundle 37, and the beam image is hence reflected by the back surface of scanning mirror 34, which now serves as a Y descanner, to the lens 38. Descanning the received beam in this way allows the reflected beam image to be independent of the Y direction variations. The descanned beam is reflected by mirror 39 through an aperture 40 in plate 41 and is applied to a photomultiplier 42. Plate 41 is an optical shield for the light sensor 42 but allows passage of the beam image and received light through aperture 40. The deflection action of the acousto-optic cell 10 causes the resulting received beam to sweep back and forth across aperture 40. It is explained in the cross-referenced patent how the sensing of received light and its timing relative to a reference is used to determine profile information, that is, range or the Z dimension, by optical triangulation.

In conclusion, two identical prism telescopes are utilized to fold the optical beam through 180° while providing matching requirements for an acousto-optical cell. The folded beam deflection system has low transmission losses, negligible optical distortion, is easy to mount and align and focus, and is very compact.

While the invention has been particularly shown and described with reference to a preferred embodiment, it will be understood by those skilled in the art that the foregoing and other changes in form and details may be made without departing from the spirit and scope of the invention.

The invention claimed is:
1. A light beam deflection system comprising:
an acousto-optic deflector which has an active region and deflects an incident beam of light through a range of angles;
a light source providing a substantially symmetrical input beam;
incident prism telescope means comprised of a train of optical prisms to expand said input beam along one dimension to fill said active region and maximize deflector resolution while redirecting the expanded beam through 90°; and exit prism telescope means comprised of a second train of optical prisms to reduce the beam size while multiplying the angle of deflection and redirecting the reduced beam through an additional 90° such that the output beam is folded through 180° and is scanned along one axis.

2. The deflection system of claim 1 wherein all of said optical prisms are 45-90-45 degree right angle prisms.

3. The deflection system of claim 2 wherein there are an odd number of prisms, greater than three and less than nine, in each prism telescope.

4. The deflection system of claim 2 wherein every prism has a face on which light is incident at Brewster's angle to reduce losses.

5. The deflection system of claim 1 wherein every prism has opposing flat bases, and at least one prism is rotated slightly about an axis perpendicular to its bases in order to adjust the angular path of the beam precisely.

6. The deflection system of claim 1 wherein all of said prisms are right angle prisms, and a recessed patterned mounting plate to which said acousto-optic deflector and prisms are secured, said plate having stops to assure alignment of said prisms.

7. The deflection system of claim 1 further comprising a scanner operable to scan said output beam along a second axis orthogonal to the first.

8. A folded beam deflection system comprising:
an acousto-optic deflector cell which has an active region and deflects and scans an incident beam of light through a range of angles;
a laser source providing a cylindrically symmetric input beam;
incident prism telescope means comprised of a train of prisms to progressively increase the input beam size along one dimension to the maximum width to fill the active region and maximize resolution of said acousto-optic cell while redirecting the expanded beam through 90°;
exit prism telescope means comprised of a second train of prisms to progressively reduce the size of the beam emerging from said acousto-optic cell by a given factor while increasing the angle of deflection by the same factor and redirecting the reduced beam through an additional angle of 90°, such that the output beam is folded through 180° relative to the input beam and has the original dimensions and is scanned along one axis; and
a recessed patterned mounting plate to which said acousto-optic cell and both trains of prisms are secured in proper alignment.

9. The deflection system of claim 8 wherein said prisms are all 45-90-45 degree prisms and one face of each is operated at Brewster's angle.

10. The deflection system of claim 9 wherein said incident and exit prism telescope means have identical, mirror image trains of prisms.

11. The deflection system of claim 8 wherein said mounting plate is patterned with triangular stops to receive and align said prisms.

12. The deflection system of claim 11 wherein at least one prism in both trains of prisms is rotated slightly about an axis perpendicular to a supporting base to adjust the angular path of the beam precisely.

13. The deflection system of claim 8 further comprising means to scan said output beam along a second axis orthogonal to said first axis.

14. The deflection system of claim 13 wherein said scanning means is a mirror controlled by a galvanometer.

* * * * *